United States Patent
Cho et al.

(10) Patent No.: US 11,059,022 B2
(45) Date of Patent: Jul. 13, 2021

(54) HIGHLY SELECTIVE CARBON MONOXIDE ADSORBENT AND METHOD OF PREPARING THE SAME

(71) Applicant: KOREA INSTITUTE OF ENERGY RESEARCH, Daejeon (KR)

(72) Inventors: Kanghee Cho, Daejeon (KR); Sang Sup Han, Daejeon (KR); Taesung Jung, Daejeon (KR); Hee Tae Beum, Daejeon (KR); Jong Nam Kim, Daejeon (KR); Jungsu Kim, Chungcheongbuk-do (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 233 days.

(21) Appl. No.: 15/679,372

(22) Filed: Aug. 17, 2017

(65) Prior Publication Data
US 2019/0054443 A1     Feb. 21, 2019

(30) Foreign Application Priority Data
Nov. 9, 2016    (KR) .......................... 10-2016-0148772

(51) Int. Cl.
*B01J 20/02*     (2006.01)
*B01J 20/08*     (2006.01)
(Continued)

(52) U.S. Cl.
CPC .......... *B01J 20/0237* (2013.01); *B01D 53/02* (2013.01); *B01J 20/0281* (2013.01);
(Continued)

(58) Field of Classification Search
CPC ... B01D 53/02; B01J 20/0237; B01J 20/0281; B01J 20/0288; B01J 20/08;
(Continued)

(56) References Cited

U.S. PATENT DOCUMENTS

2006/0090646 A1    5/2006   Sawada et al.
2007/0131589 A1*   6/2007   Weston ................... C01B 3/32
                                                    208/213
(Continued)

FOREIGN PATENT DOCUMENTS

CN        1890021 A      1/2007
CN        101547733 A    9/2009
(Continued)

OTHER PUBLICATIONS

1st Office Action issued by the CNIPA dated Mar. 24, 2020 for the corresponding Chinese Patent Application No. 201710788465.1.
(Continued)

*Primary Examiner* — Anthony J Zimmer
*Assistant Examiner* — Syed T Iqbal
(74) *Attorney, Agent, or Firm* — Cantor Colburn LLP

(57) ABSTRACT

A highly selective carbon monoxide adsorbent and a method of preparing the highly selective carbon monoxide adsorbent are provided. The highly selective carbon monoxide adsorbent includes a boehmite or pseudo-boehmite in which a copper compound is dispersed.

16 Claims, 2 Drawing Sheets

```
┌─────────────────────────────────────────────────────┐   ─110
│  Prepare mixture of boehmite or pseudo-boehmite     │
│              and copper compound                    │
└─────────────────────────────────────────────────────┘
                          │
                          ▼                              ─120
┌─────────────────────────────────────────────────────┐
│  Thermally disperse copper compound in boehmite     │
│              or pseudo-boehmite                     │
└─────────────────────────────────────────────────────┘
```

(51) Int. Cl.
*B01J 20/28* (2006.01)
*B01J 20/32* (2006.01)
*B01J 20/30* (2006.01)
*B01D 53/02* (2006.01)

(52) U.S. Cl.
CPC ........... *B01J 20/0288* (2013.01); *B01J 20/08* (2013.01); *B01J 20/2808* (2013.01); *B01J 20/28071* (2013.01); *B01J 20/28073* (2013.01); *B01J 20/28076* (2013.01); *B01J 20/28083* (2013.01); *B01J 20/3078* (2013.01); *B01J 20/3204* (2013.01); *B01J 20/3236* (2013.01); *B01J 20/3265* (2013.01); *B01D 2253/104* (2013.01); *B01D 2253/112* (2013.01); *B01D 2253/25* (2013.01); *B01D 2257/502* (2013.01)

(58) Field of Classification Search
CPC ............ B01J 20/28071; B01J 20/28073; B01J 20/28076; B01J 20/2808; B01J 20/28083; B01J 20/3078; B01J 20/3204; B01J 20/3236; B01J 20/3265
See application file for complete search history.

(56) References Cited

U.S. PATENT DOCUMENTS

| | | | | |
|---|---|---|---|---|
| 2010/0331571 | A1* | 12/2010 | Saito | B01J 23/002 562/532 |
| 2012/0123150 | A1* | 5/2012 | Madon | B01J 35/0066 560/265 |
| 2016/0256850 | A1* | 9/2016 | Evans | B01J 20/06 |
| 2017/0252727 | A1* | 9/2017 | Paulus | B01J 35/108 |

FOREIGN PATENT DOCUMENTS

| | | |
|---|---|---|
| CN | 101927152 A | 12/2010 |
| CN | 104492375 A | 4/2015 |
| CN | 105413708 A | 3/2016 |
| CN | 105749873 A | 7/2016 |
| JP | S62108724 A | 5/1987 |
| JP | H0751577 A | 2/1995 |
| KR | 1020050100985 A | 10/2005 |
| KR | 20080013506 A | 2/2008 |
| KR | 20080106632 A | 12/2008 |
| WO | 2005060519 A2 | 7/2005 |

OTHER PUBLICATIONS

Kang Xia et al., "The Distribution of Cu( II ) on Boehmite and Silica Surfaces: Correlating EPR Signal Loss with the Effective Bohr Magneton Number of Sorbed Ions," Journal of Colloid and Interface Science, 1998, pp. 77-82, vol. 199.

Yan Huang et al. "Preparation of CuCl@AC with high CO adsorption capacity and selectivity from CO/N2 binary mixture," Adsorption, 2015, pp. 373-381, vol. 21.

2nd Office Action issued by the CNIPA dated Sep. 28, 2020 for the corresponding Chinese Patent Application No. 201710788465.1.

* cited by examiner

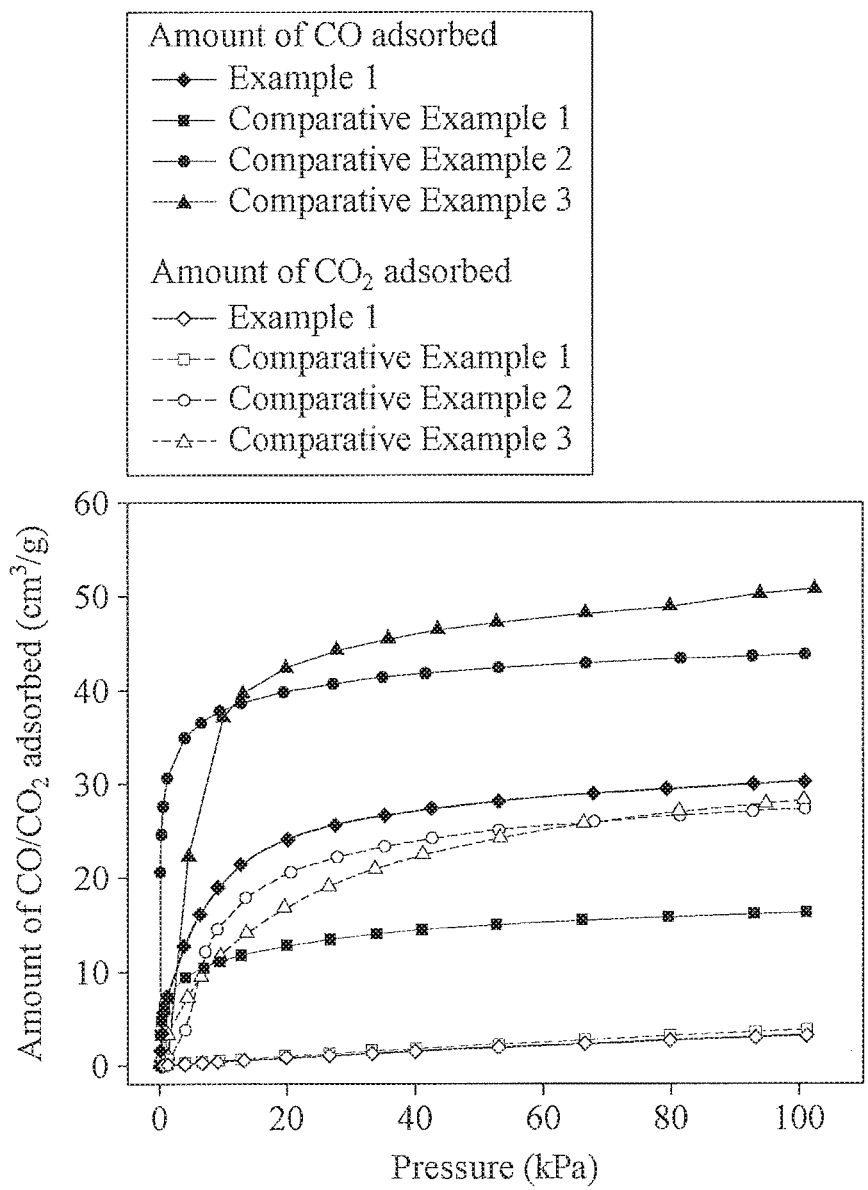

HIGHLY SELECTIVE CARBON MONOXIDE ADSORBENT AND METHOD OF PREPARING THE SAME

CROSS-REFERENCE TO RELATED APPLICATION

This application claims the benefit of Korean Patent Application No. 10-2016-0148772, filed on Nov. 9, 2016, in the Korean Intellectual Property Office, the disclosure of which is incorporated herein by reference.

BACKGROUND

1. Field of the Invention

At least one exemplary embodiment relates to a highly selective carbon monoxide adsorbent and a method of preparing the highly selective carbon monoxide adsorbent to selectively adsorb, separate and purify carbon monoxide.

2. Description of the Related Art

Linz-Donawitz gas (LDG) as a by-product gas of a steel-making process includes 65-80% carbon monoxide, 5-7% carbon dioxide, and a small amount of nitrogen. Blast furnace gas (BFG) as a by-product gas of a steel-making process includes 20-36% carbon monoxide, 4-13% carbon dioxide, 55-61% nitrogen, and 1.5-8% hydrogen. Although carbon monoxide generated by the by-product gas is 3 million tons per year, most of carbon monoxide currently emitted is burned as a heat source instead of being recovered.

Carbon monoxide production sources and generation sources are diversified, and an interest in a resource recovery and application to high-value products (for example, acetic acid, polyurethane, polycarbonate, formic acid, acrylic acid, phosgene, and the like) is increasing. Accordingly, a demand for development of a technology for adsorption and separation of carbon monoxide is increasing.

Currently, to separate carbon monoxide, a cryogenic separation method, an absorption method, an adsorption method, and the like are mainly used. The adsorption method employs a carbon monoxide adsorbent and has an advantage of small- and medium-scale carbon monoxide separation in terms of costs.

Because the by-product gas of steel-making processed, such as LDG or BFG, includes a large amount of carbon monoxide and a large amount of carbon dioxide and a small amount of gas, an adsorbent that has a superior selectivity of carbon monoxide over carbon dioxide and that adsorbs a large amount of carbon monoxide at normal temperature and pressure may be required to adsorb a large amount of carbon monoxide.

In general, a carbon monoxide adsorbent contains a copper(I) compound, and is used to selectively adsorb and separate carbon monoxide from, for example, synthetic gas or steam reforming gas which includes hydrogen and carbon monoxide. However, since a copper(I) compound is not dissolved in a general solvent in the carbon monoxide adsorbent, it is difficult to uniformly disperse the copper(I) compound. Also, a method of depositing copper(II) salts on a solid support and converting the copper(II) salts to copper (I) salts through a reduction operation, or a method of impregnating copper(I) salts to a solid support after vaporization is used. However, copper(I) salts may not be uniformly dispersed in the solid support, or may have a low adsorption characteristic of carbon monoxide.

SUMMARY

The present disclosure is to solve the foregoing problems, and an aspect provides a highly selective carbon monoxide adsorbent that has a high selectivity to carbon monoxide and that includes a boehmite or pseudo-boehmite as a support in which a copper compound is dispersed.

Another aspect provides a method of preparing a highly selective carbon monoxide adsorbent.

However, the problems to be solved in the present disclosure are not limited to the foregoing problems, and other problems not mentioned herein would be clearly understood by one of ordinary skill in the art from the following description.

According to an aspect, there is provided a highly selective carbon monoxide including a boehmite or pseudo-boehmite as a support in which a copper compound is dispersed.

The boehmite or pseudo-boehmite may be $AlO_X(OH)_{(3-2X)}(H_2O)_z$ in which X is less than 1.5. A specific surface area of the boehmite or pseudo-boehmite may be greater than or equal to $300 \text{ m}^2\text{g}^{-1}$.

A pore volume of the boehmite or pseudo-boehmite may be greater than or equal to $0.2 \text{ cm}^3\text{g}^{-1}$.

A pore size of the boehmite or pseudo-boehmite may be less than or equal to 20 nm.

The copper compound is either thermally dispersed over a surface of the boehmite or pseudo-boehmite or is impregnated into a pore of the boehmite or pseudo-boehmite, or both.

The copper compound may be a copper(I) salt.

The copper compound may include at least one of cuprous chloride, cuprous fluoride, cuprous iodide, cuprous bromide, cuprous nitride, cuprous acetate, cuprous thiocyanate, copper thiobenzoate, copper thiobutylate, cuprous benzoate, cuprous sulfate and cuprous thiosulfate.

The copper compound may be dispersed in an amount of 10% by weight (wt %) to 50 wt % in the boehmite or pseudo-boehmite, based on a total weight of the highly selective carbon monoxide adsorbent.

A pure component selectivity of carbon monoxide with respect to carbon dioxide may be greater than or equal to 4. The pure component selectivity may be a ratio of an amount of carbon monoxide to be adsorbed at 20° C. and 1 bar to an amount of carbon dioxide to be adsorbed at 20° C. and 1 bar.

An amount of carbon monoxide adsorbed per unit mass of the highly selective carbon monoxide adsorbent at a room temperature of 20° C. to 30° C. may be greater than or equal to 1.35 mmol/g, and an amount of carbon dioxide adsorbed per unit mass of the highly selective carbon monoxide adsorbent at the room temperature of 20° C. to 30° C. may be less than or equal to 0.20 mmol/g.

According to another aspect, there is provided a method of preparing a highly selective carbon monoxide adsorbent, the method including preparing a mixture of a boehmite or pseudo-boehmite and a copper compound, and thermally dispersing the copper compound in the boehmite or pseudo-boehmite.

The thermally dispersing may include thermally dispersing the copper compound at a temperature of 250° C. to 350° C. for 1 hour to 48 hours.

The thermally dispersing may include thermally dispersing the copper compound under a vacuum or an atmosphere that includes either one or both of inert gas and reducing gas.

According to another aspect, there is provided a method of preparing a highly selective carbon monoxide adsorbent, the method including preparing an impregnation solution including a copper compound and a solvent, impregnating a support with the copper compound by contacting the impregnation solution with a boehmite or pseudo-boehmite, drying the impregnated support, and thermally treating the impregnated support.

The drying may include drying the impregnated support under a vacuum or an atmosphere that includes either one or both of inert gas and reducing gas, at a temperature of 30° C. to 60° C. for 1 hour to 50 hours. The thermal treatment process may include thermally treating the impregnated support under a vacuum or an atmosphere that includes either one or both of inert gas and reducing gas, at a temperature of 110° C. to 400° C. for 10 minutes to 20 hours.

The impregnating may include impregnating the support with the copper compound at a temperature of 15° C. to 60° C. using an incipient wetness impregnation method. The solvent may include at least one of water, toluene, ethyl acetate and acetonitrile.

The impregnation solution may further include at least one of ammonia, nitric acid, hydrochloric acid and sulfuric acid.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3 is a graph illustrating amounts of carbon monoxide and carbon dioxide adsorbed by prepared highly selective carbon monoxide adsorbents based on Experimental Example 1 according to an example embodiment.

DETAILED DESCRIPTION

Figure 1:
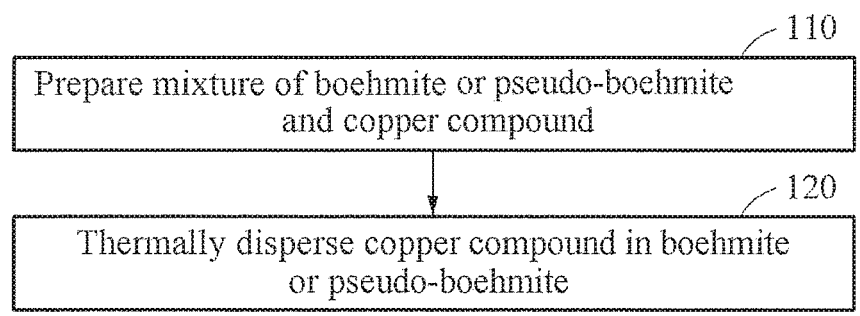
FIG. 1 is a flowchart illustrating an example of a method of preparing a highly selective carbon monoxide adsorbent according to an example embodiment.

Hereinafter, exemplary embodiments of the present disclosure will be described in detail with reference to the accompanying drawings. When it is determined that a detailed description related to a related known function or configuration may make the purpose of the present disclosure unnecessarily ambiguous, such detailed description will be omitted. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

According to an example embodiment, a highly selective carbon monoxide adsorbent may be provided. The highly selective carbon monoxide adsorbent may have a high adsorption selectivity for carbon monoxide in a mixed gas, and may adsorb a large amount of carbon monoxide.

The highly selective carbon monoxide adsorbent may include a copper compound, and a boehmite or pseudo-boehmite.

In the highly selective carbon monoxide adsorbent, the copper compound may be dispersed in the boehmite or pseudo-boehmite. In an example, the copper compound may be dispersed in either one or both of a surface of the boehmite or pseudo-boehmite and a pore of the boehmite or pseudo-boehmite. In another example, the copper compound may be impregnated into either one or both of the surface and the pore. In still another example, the copper compound may be dispersed and impregnated in the surface and the pore. The highly selective carbon monoxide adsorbent may have both a characteristic of the copper compound and a characteristic of the boehmite or pseudo-boehmite, and accordingly may provide an extremely high selectivity of carbon monoxide in comparison to an existing carbon monoxide adsorbent to which a zeolite or alumina is applied.

The boehmite or pseudo-boehmite may include, for example, $AlO_x(OH)_{(3-2X)}(H_2O)_z$. The boehmite or pseudo-boehmite may provide a superior adsorbability and selectivity of carbon monoxide in comparison to aluminum oxide, for example, a crystalline or amorphous aluminum oxide, zeolite, and the like. For example, in $AlO_x(OH)_{(3-2X)}(H_2O)_z$, X is a real number in a range of less than "1.5", a range of "0" to "1.5" or a range of "0.88" to "1.5," and Z is a real number between "0" and "1." When values of X and Z are within the above ranges, the copper compound may be uniformly dispersed in either one or both of the surface and pore of the boehmite or pseudo-boehmite.

A specific surface area of the boehmite or pseudo-boehmite may be, for example, greater than or equal to 300 $m^2g^{-1}$, or may range from 300 $m^2g^{-1}$ to 500 $m^2g^{-1}$. When the specific surface area is within the above ranges, an adsorption area of carbon monoxide may increase, which may lead to an increase in an adsorption characteristic for carbon monoxide.

A pore volume of the boehmite or pseudo-boehmite may be greater than or equal to 0.2 $cm^3g^{-1}$, or may range from 0.2 $cm^3g^{-1}$ to 0.5 $cm^3g^{-1}$. When the pore volume is within the above ranges, an amount of the copper compound to be dispersed in the boehmite or pseudo-boehmite may increase.

A pore size of the boehmite or pseudo-boehmite may be less than or equal to 20 nm, may range from 2 nm to 20 nm, or may range from 3 nm to 10 nm. When the pore size is within the above ranges, the copper compound may be uniformly dispersed in either one or both of the surface and pore of the boehmite or pseudo-boehmite, and may provide an excellent carbon monoxide adsorption characteristic.

For example, the copper compound may be a copper(I) salt. The copper(I) salt may include, for example, at least one of cuprous chloride, cuprous fluoride, cuprous iodide, cuprous bromide, cuprous nitride, cuprous acetate, cuprous thiocyanate, copper thiobenzoate, copper thiobutylate, cuprous benzoate, cuprous sulfate and cuprous thiosulfate.

The copper compound may be dispersed in an amount of 10% by weight (wt %) to 50 wt % or an amount of 25 wt % to 35 wt % in the boehmite or pseudo-boehmite, based on a total weight of the highly selective carbon monoxide adsorbent. When the amount of the copper compound is within the above ranges, a large amount of copper compound may be uniformly dispersed in the boehmite or pseudo-boehmite, which may lead to an increase in an adsorption characteristic for carbon monoxide.

In the highly selective carbon monoxide adsorbent, a pure component selectivity of carbon monoxide with respect to carbon dioxide may be greater than or equal to "4," greater than or equal to "5," or greater than or equal to "8." The pure component selectivity may be, for example, a ratio of a carbon monoxide adsorption amount to a carbon dioxide adsorption amount. For example, an amount of carbon monoxide adsorbed per unit mass of the highly selective carbon monoxide adsorbent at a room temperature of 20° C. to 30° C. may be greater than or equal to 1.35 mmol/g, and an amount of carbon dioxide adsorbed per unit mass of the highly selective carbon monoxide adsorbent at the room temperature of 20° C. to 30° C. may be less than or equal to 0.20 mmol/g.

According to an example embodiment, a method of preparing a highly selective carbon monoxide adsorbent may be provided. Using the method, a high-concentration copper compound may be uniformly dispersed in a boehmite or pseudo-boehmite, and a highly selective carbon monoxide adsorbent with an excellent adsorption characteristic for carbon monoxide may be provided.

FIG. 1 is a flowchart illustrating an example of a method of preparing a highly selective carbon monoxide adsorbent according to an example embodiment. Referring to FIG. 1, the method may include operation 110 of preparing a mixture of a boehmite or pseudo-boehmite and a copper compound, and operation 120 of thermally dispersing the copper compound in the boehmite or pseudo-boehmite.

In operation 110, the boehmite or pseudo-boehmite and the copper compound may be ground and mixed. To grind and mix the boehmite or pseudo-boehmite and the copper compound, a device used in the art to which the present disclosure relates may be used and may include, for example, a ball mill, a mixer, and the like. For example, in operation 110, a mass ratio of the boehmite or pseudo-boehmite:the copper compound may range from 90:10 to 50:50, or from 75:25 to 65:35.

In operation 120, the copper compound may be thermally dispersed in an inert gas atmosphere at a thermal dispersion temperature of 250° C. to 350° C., 250° C. to 330° C., or 270° C. to 300° C. When the thermal dispersion temperature is within the above ranges, a conversion to AlOOH and a crystalline or amorphous aluminum oxide may be prevented, and a high-concentration copper compound may be induced to be uniformly dispersed in either one or both of a surface and pore of the boehmite or pseudo-boehmite while maintaining a characteristic of the boehmite or pseudo-boehmite. Also, a conversion to metallic copper (Cu) of the copper compound due to an increase in a temperature may be prevented, and a characteristic of the copper compound may be maintained in the highly selective carbon monoxide adsorbent.

For example, operation 120 may be performed for 1 hour to 48 hours. When operation 120 is performed within 1 hour to 48 hours, the copper compound may be uniformly thermally dispersed in the boehmite or pseudo-boehmite while maintaining a characteristic of the copper compound.

Operation 120 may be performed in an environment, for example, a vacuum, in which oxygen and moisture are excluded, or in an atmosphere that includes either one or both of inert gas and reducing gas. The inert gas may include, for example, nitrogen, argon or helium, and the reducing gas may include, for example, hydrogen or carbon monoxide.

Figure 2:
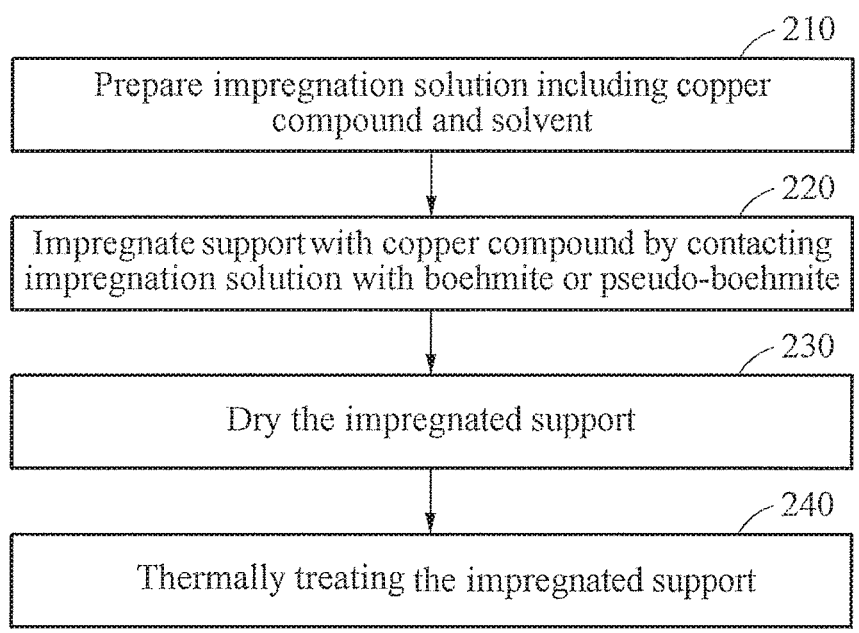
FIG. 2 is a flowchart illustrating another example of a method of preparing a highly selective carbon monoxide adsorbent according to an example embodiment.

According to an example embodiment, another method of preparing a highly selective carbon monoxide adsorbent may be provided. FIG. 2 is a flowchart illustrating another example of a method of preparing a highly selective carbon monoxide adsorbent according to an example embodiment. Referring to FIG. 2, the method may include operation 210 of preparing an impregnation solution including a copper compound and a solvent, operation 220 of impregnating a support with the copper compound by contacting the impregnation solution with a boehmite or pseudo-boehmite, operation 230 of drying the impregnated support and operation 240 of thermally treating the impregnated support.

In operation 210, the impregnation solution may be prepared by mixing the above-described copper compound with the solvent that includes at least one of water, toluene, ethyl acetate and acetonitrile.

To dissolve the copper compound and induce the copper compound to be uniformly impregnated in a support, the impregnation solution may further include acid and base. The impregnation solution may include, for example, at least one of ammonia, nitric acid, hydrochloric acid and sulfuric acid. The ammonia may desirably be a 20-30% aqueous ammonia solution, a 1-5N (normality) aqueous nitric acid solution, a 1-5N aqueous hydrochloric acid solution and a 1-5N aqueous sulfuric acid solution.

In operation 210, the copper compound and the solvent may be stirred at a temperature of a room temperature to 40° C. for 30 minutes to 4 hours, to prepare the impregnation solution.

Operation 220 may be performed at a temperature of 15° C. to 60° C. or a temperature of 30° C. to 40° C. for 1 hour to 20 hours using an incipient wetness impregnation method.

In operation 230, the impregnated support may be filtered, and may be dried at a temperature of 30° C. to 60° C. or a temperature of 40° C. to 50° C., under a vacuum or an atmosphere that includes either one or both of inert gas and reducing gas, for 1 hour to 50 hours, desirably for 5 hours to 20 hours.

In operation 240, the impregnated support dried in operation 230 may be treated thermally using a heating device, for example, an electric furnace, under a vacuum or an atmosphere that includes either one or both of inert gas and reducing gas, at a temperature of 110° C. to 400° C. or a temperature of 250° C. to 330° C. for 10 minutes to 20 hours, desirably for 5 hours to 15 hours.

According to an example embodiment, a method of preparing a highly selective carbon monoxide adsorbent may further include a post treatment process, for example, grinding, washing, and the like, and further description of the post treatment process is omitted herein.

Hereinafter, the present disclosure will be described with reference to example embodiments, however, is not intended to be limited to the example embodiments. Various modifications and changes may be made in the present disclosure without departing from the spirit and scope of the present disclosure as defined by the appended claims, the detailed description and accompanying drawings.

Example 1

CuCl (3 g) and boehmite (7 g) were added, ground and mixed by a ball mill for 10 minutes. A mixture was inserted into a reactor, was thermally dispersed at 300° C. for 24 hours under a vacuum atmosphere and was cooled to a room temperature, to obtain an adsorbent.

Example 2

Boehmite (7 g) was dried at 150° C. for 24 hours. CuCl (3 g) was mixed in 10 mL of an aqueous ammonia solution (28%) and a mixed solution was stirred at the room temperature for 1 hour in an airtight state. The mixed solution was impregnated in a prepared boehmite at the room temperature using an incipient wetness impregnation method, and was stored in an airtight container for 30 minutes. Drying was performed in a vacuum oven that is set at 40° C. for 24 hours by purging nitrogen. A dried adsorbent was thermally treated at 300° C. for 12 hours in a heating furnace with a nitrogen atmosphere and was stored in an airtight container.

Comparative Example 1

CuCl (3 g) and alumina (7 g) were ground and mixed by a ball mill for 10 minutes. A mixture was inserted into a reactor, was thermally dispersed at 300° C. for 24 hours under a vacuum atmosphere and was cooled to the room temperature, to obtain an adsorbent.

Comparative Example 2

CuCl (3 g) and zeolite (13X, 7 g) were ground and mixed by a ball mill for 10 minutes. A mixture was inserted into a reactor, was thermally dispersed at 300° C. for 24 hours under a vacuum atmosphere and was cooled to the room temperature, to obtain an adsorbent.

Comparative Example 3

CuCl (3 g) and zeolite (Y, 7 g) were ground and mixed by a ball mill for 10 minutes. A mixture was inserted into a reactor, was thermally dispersed at 300° C. for 24 hours under a vacuum atmosphere and was cooled to the room temperature, to obtain an adsorbent.

Experimental Example 1

The adsorbents prepared based on Examples 1 and 2 and Comparative Examples 1 through 3 were pre-treated under a vacuum at 300° C. for 3 hours, prior to a measurement of an adsorption amount, and impurities were removed. Adsorption amounts of carbon monoxide (CO) (99.999%) were measured at atmospheric pressures of 101 kPa and 293 K using a volumetric method, and results are shown in Table 1 and FIG. 3.

TABLE 1

| | Adsorbent | CO adsorption amount, $a_{CO}$ ($cm^3/g$) | $CO_2$ adsorption amount, $a_{CO2}$ ($cm^3/g$) | $a_{CO}/a_{CO2}$ (—) | Specific surface area ($m^2/g$) |
|---|---|---|---|---|---|
| Example 1 | CuCl/ AlO(OH)($H_2O$)$_z$ (X = 1) | 30.2 | 3.17 | 9.5 | 203 |
| Example 2 | CuCl/ AlO(OH)($H_2O$)$_z$ (X = 1) | 29.1 | 3.21 | 9.06 | 201 |
| Comparative Example 1 | CuCl/alumina | 16.3 | 3.79 | 4.3 | 169 |
| Comparative Example 2 | CuCl/13X | 43.8 | 27.3 | 1.6 | 211 |
| Comparative Example 3 | CuCl/Y | 50.8 | 28.2 | 1.8 | 220 |

Referring to Table 1 and FIG. 3, in the adsorbents of Examples 1 and 2, that is, highly selective carbon monoxide adsorbents that each include a boehmite in which a copper compound is dispersed according to an example embodiment, a carbon monoxide selectivity significantly increased in comparison to the adsorbents prepared based on Comparative Examples 1 through 3 in which an alumina and zeolite were used. The adsorbents of Examples 1 and 2 may disperse the copper compound to maintain both a characteristic of the boehmite and a characteristic of the copper compound, and thus may provide a high selectivity to carbon monoxide.

Examples 3 Through 6

Boehmite of Table 2 (for example, $AlO_X(OH)_{(3-2X)}(H_2O)_z$ (7 g)) was dried at 150° C. for 24 hours. The boehmite and CuCl (3 g) were added, ground and mixed by a ball mill for 10 minutes. A mixture was inserted into a reactor, was thermally dispersed at 250° C., 270° C., 330° C. and 350° C. for 24 hours under a vacuum atmosphere and was cooled to the room temperature, to obtain adsorbents.

Experimental Example 2

The adsorbents prepared based on Examples 3 through 6 were pre-treated under a vacuum at 300° C. for 3 hours, prior to a measurement of an adsorption amount, and impurities were removed. Adsorption amounts of CO (99.999%) were measured at atmospheric pressures of 101 kPa and 293 K using the volumetric method, and results are shown in Table 2.

TABLE 2

|  | Thermal dispersion temperature (° C.) | Adsorbent $AlO_X(OH)_{(3-2X)}$ $(H_2O)_z$ | CO adsorption amount, $a_{CO}$ ($cm^3$/g) | $CO_2$ adsorption amount, $a_{CO2}$ ($cm^3$/g) | $a_{CO}/a_{CO2}$ (—) | Specific surface area ($m^2$/g) |
|---|---|---|---|---|---|---|
| Example 1 | 300 | X = 1 | 30.2 | 3.17 | 9.5 | 203 |
| Example 3 | 250 | X = 0.927 | 23.8 | 2.69 | 8.83 | 162 |
| Example 4 | 270 | X = 0.964 | 30.3 | 2.87 | 10.53 | 178 |
| Example 5 | 330 | X = 1.108 | 28.6 | 3.54 | 8.07 | 198 |
| Example 6 | 350 | X = 1.170 | 25.1 | 4.89 | 5.13 | 210 |

Referring to Table 2, a highly selective carbon monoxide adsorbent including a boehmite or pseudo-boehmite in which a copper compound is dispersed according to an example embodiment provides an excellent carbon monoxide selectivity.

According to example embodiments, a highly selective carbon monoxide adsorbent including a boehmite or pseudo-boehmite in which a copper compound is dispersed may be provided. The highly selective carbon monoxide adsorbent may have an extremely high selectivity to carbon monoxide over carbon dioxide, in comparison to existing adsorbents.

Also, the highly selective carbon monoxide adsorbent may adsorb a large amount of carbon monoxide and a small amount of carbon dioxide, by applying a boehmite or pseudo-boehmite as a support.

In addition, a selectivity of carbon monoxide in mixed gas may be enhanced in comparison to carbon dioxide, and thus it is possible to effectively apply the highly selective carbon monoxide adsorbent to selectively adsorb the carbon monoxide and separate the carbon monoxide from the mixed gas.

Although a few example embodiments of the present disclosure have been shown and described, the present disclosure is not limited to the described example embodiments. Instead, it would be appreciated by those skilled in the art that changes may be made to these example embodiments without departing from the principles and spirit of the present disclosure, the scope of which is defined by the claims and their equivalents.

What is claimed is:

1. A highly selective carbon monoxide adsorbent, the highly selective carbon monoxide adsorbent comprising:
    a boehmite or pseudo-boehmite as a support in which a copper compound is dispersed,
    wherein the boehmite or pseudo-boehmite is $AlO_X(OH)_{(3-2X)}(H_2O)_z$ in which X is less than 1.5 and z is 0 to 1,
    wherein the copper compound comprises a copper(I) salt that is thermally dispersed in the support, and
    wherein the copper (I) salt comprises at least one selected from the group consisting of cuprous chloride, cuprous fluoride, cuprous iodide, cuprous bromide, cuprous nitride, cuprous acetate, cuprous thiocyanate, copper thiobenzoate, copper thiobutylate, cuprous benzoate, cuprous sulfate, and cuprous thiosulfate.

2. The highly selective carbon monoxide adsorbent of claim 1, wherein a pore volume of the boehmite or pseudo-boehmite is greater than or equal to 0.2 $cm^3 g^{-1}$.

3. The highly selective carbon monoxide adsorbent of claim 1, wherein the copper compound is thermally dispersed over a surface of the boehmite or pseudo-boehmite, is thermally dispersed in a pore of the boehmite or pseudo-boehmite, or both.

4. The highly selective carbon monoxide adsorbent of claim 1, wherein a pore size of the boehmite or pseudo-boehmite is less than or equal to 20 nm.

5. The highly selective carbon monoxide adsorbent of claim 1, wherein the copper compound is dispersed in an amount of 10% by weight (wt %) to 50 wt % in the boehmite or pseudo-boehmite, based on a total weight of the highly selective carbon monoxide adsorbent.

6. The highly selective carbon monoxide adsorbent of claim 1, wherein a pure component selectivity of carbon monoxide with respect to carbon dioxide is greater than or equal to 4, and the pure component selectivity of the carbon monoxide with respect to the carbon dioxide is a ratio of a carbon monoxide adsorption amount to a carbon dioxide adsorption amount.

7. The highly selective carbon monoxide adsorbent of claim 1, wherein an amount of carbon monoxide adsorbed per unit mass of the highly selective carbon monoxide adsorbent at a room temperature of 20° C. to 30° C. is greater than or equal to 1.35 mmol/g, and an amount of carbon dioxide adsorbed per unit mass of the highly selective carbon monoxide adsorbent at the room temperature of 20° C. to 30° C. is less than or equal to 0.20 mmol/g.

8. The highly selective carbon monoxide adsorbent of claim 1, wherein the copper (I) salt is thermally dispersed at a temperature of 250° C. to 350° C. for 1 hour to 48 hours.

9. The highly selective carbon monoxide adsorbent of claim 1, wherein the copper (I) salt is thermally dispersed under a vacuum or an atmosphere that comprises either one or both of inert gas and reducing gas.

10. A method of preparing a highly selective carbon monoxide adsorbent, the method comprising:
    preparing a mixture of a boehmite or pseudo-boehmite as a support and a copper compound; and
    thermally dispersing the copper compound in the boehmite or pseudo-boehmite,
    wherein the boehmite or pseudo-boehmite is $AlO_X(OH)_{(3-2X)}(H_2O)_z$ in which X is less than 1.5 and z is 0 to 1, and
    wherein the copper (I) salt comprises at least one selected from the group consisting of cuprous chloride, cuprous fluoride, cuprous iodide, cuprous bromide, cuprous nitride, cuprous acetate, cuprous thiocyanate, copper thiobenzoate, copper thiobutylate, cuprous benzoate, cuprous sulfate, and cuprous thiosulfate.

11. The method of claim 10, wherein the thermally dispersing comprises thermally dispersing the copper compound at a temperature of 250° C. to 350° C. for 1 hour to 48 hours.

12. The method of claim 10, wherein the thermally dispersing comprises thermally dispersing the copper compound under a vacuum or an atmosphere that comprises either one or both of inert gas and reducing gas.

13. A method of preparing a highly selective carbon monoxide adsorbent, the method comprising:
    preparing an impregnation solution comprising a copper (I) salt and a solvent;

impregnating a support with the copper(I) salt by contacting the impregnation solution with a boehmite or pseudo-boehmite;

drying the impregnated support; and thermally treating the impregnated support to thermally disperse the copper(I) salt in the impregnated support, wherein the boehmite or pseudo-boehmite is $AlO_X(OH)_{(3-2X)}(H_2O)_z$ in which X is less than 1.5 and z is 0 to 1, and wherein the copper (I) salt comprises at least one selected from the group consisting of cuprous chloride, cuprous fluoride, cuprous iodide, cuprous bromide, cuprous nitride, cuprous acetate, cuprous thiocyanate, copper thiobenzoate, copper thiobutylate, cuprous benzoate, cuprous sulfate, and cuprous thiosulfate.

14. The method of claim 13, wherein the drying comprises drying the impregnated support under a vacuum or an atmosphere that comprises either one or both of inert gas and reducing gas, at a temperature of 30° C. to 60° C. for 1 hour to 50 hours, and the thermal treatment comprises thermally treating the impregnated support under a vacuum or an atmosphere that comprises either one or both of inert gas and reducing gas, at a temperature of 110° C. to 400° C. for 10 minutes to 20 hours.

15. The method of claim 13, wherein the impregnating comprises impregnating the support with the copper compound at a temperature of 15° C. to 60° C. using an incipient wetness impregnation method.

16. The method of claim 13, wherein the solvent comprises at least one selected from the group consisting of water, toluene, ethyl acetate and acetonitrile, and the impregnation solution further comprises at least one selected from the group consisting of ammonia, nitric acid, hydrochloric acid and sulfuric acid.

* * * * *